United States Patent
Murphy et al.

(10) Patent No.: US 10,038,978 B2
(45) Date of Patent: *Jul. 31, 2018

(54) TECHNIQUES FOR MOBILE NETWORK GEOLOCATION

(71) Applicant: Viavi Solutions UK Limited, Berkshire (GB)

(72) Inventors: Christopher Michael Murphy, Bath (GB); Michael Flanagan, Chester, NJ (US); Walter Featherstone, Cirencester (GB); Philip Geoffery Claridge, Cambridge (GB); Gareth James Smith, Newbury (GB); John Joseph Holden, Reading (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/493,858

(22) Filed: Apr. 21, 2017

(65) Prior Publication Data
US 2017/0230796 A1    Aug. 10, 2017

Related U.S. Application Data

(63) Continuation of application No. 14/699,708, filed on Apr. 29, 2015, now Pat. No. 9,635,505.

(51) Int. Cl.
*H04W 24/00*    (2009.01)
*H04W 4/02*    (2018.01)
*G01S 5/02*    (2010.01)

(52) U.S. Cl.
CPC .......... *H04W 4/023* (2013.01); *G01S 5/0294* (2013.01)

(58) Field of Classification Search
CPC .......... H04W 4/023; H04W 64/00; G01S 5/02
(Continued)

(56) References Cited

U.S. PATENT DOCUMENTS 8,374,596 B2    2/2013    Thiel et al.
8,805,433 B2    8/2014    Al-Shalash
(Continued)

FOREIGN PATENT DOCUMENTS

CN    101166327    4/2008
CN    101583191    11/2009
(Continued)

OTHER PUBLICATIONS

Extended European Search Report for European Application No. 16167673.9; dated Nov. 7, 2016, 9 pages.
(Continued)

*Primary Examiner* — Kiet Doan
(74) *Attorney, Agent, or Firm* — Harrity & Harrity, LLP

(57) ABSTRACT

Techniques for mobile network geolocation are disclosed. In one particular exemplary embodiment, the techniques may be realized as a system for mobile network geolocation. The system may comprise one or more processors communicatively coupled to a mobile communications network. The one or more processors may be configured to determine that a mobile device is on a travel path. The one or more processors may also be configured to determine one or more candidate locations of the mobile device based on data associated with the travel path. The one or more processors may further be configured to determine at least one candidate route associated with the mobile device along the travel path comprised from one or more candidate locations.

20 Claims, 17 Drawing Sheets

(58) Field of Classification Search
USPC .................. 455/442, 437, 456.1, 524, 435.2
See application file for complete search history.

(56) References Cited

U.S. PATENT DOCUMENTS

| | | | |
|---|---|---|---|
| 9,635,505 | B2 | 4/2017 | Murphy et al. |
| 2007/0229546 | A1 | 10/2007 | Klassen et al. |
| 2009/0005972 | A1 | 1/2009 | Koning |
| 2011/0172916 | A1 | 7/2011 | Pakzad et al. |
| 2011/0319093 | A1 | 12/2011 | Flanagan |
| 2013/0143588 | A1 | 6/2013 | Flanagan et al. |
| 2013/0210449 | A1 | 8/2013 | Flanagan |
| 2013/0210450 | A1 | 8/2013 | Kenington et al. |
| 2013/0225229 | A1* | 8/2013 | Al-Shalash ........... H04W 24/10 455/524 |
| 2014/0057634 | A1* | 2/2014 | Chang .................. H04W 36/32 455/437 |
| 2014/0171102 | A1 | 6/2014 | Murphy et al. |
| 2014/0171103 | A1 | 6/2014 | Murphy et al. |
| 2014/0236483 | A1 | 8/2014 | Beaurepaire et al. |
| 2015/0004974 | A1 | 1/2015 | Karimi-Cherkandi et al. |
| 2015/0168161 | A1* | 6/2015 | Raychev ................ G01C 21/32 701/430 |

FOREIGN PATENT DOCUMENTS

| | | |
|---|---|---|
| CN | 101635880 | 1/2010 |
| CN | 102469500 | 5/2012 |
| CN | 103604435 | 2/2014 |
| WO | WO 2005/031996 | 3/2008 |
| WO | 2011/039930 | 4/2011 |
| WO | 2012/0176022 | 12/2012 |
| WO | 2012/0038046 | 3/2015 |

OTHER PUBLICATIONS

White et al., "Some map matching algorithms for personal navigation assistants", Transportation Research Part C 8 (2000), pp. 91-108.

Co-pending U.S. Appl. No. 14/451,931, entitled "Techniques for Multiple Pass Geolocation", by Thiel et al., filed Aug. 5, 2014, 52 pages.

* cited by examiner

_US 10,038,978 B2_

TECHNIQUES FOR MOBILE NETWORK GEOLOCATION

RELATED APPLICATION

This application is a continuation of U.S. patent application Ser. No. 14/699,708, filed Apr. 29, 2015 (now U.S. Pat. No. 9,635,505), the disclosure of which is incorporated herein by reference.

TECHNICAL FIELD

The present application relates to a wireless telecommunications system, and more particularly, to techniques for mobile network geolocation within a wireless telecommunications system.

BACKGROUND

Mobile communication devices, such as smart phones, tablets, and other electronic hand-held devices, are becoming increasingly popular. Although mechanisms exist to locate mobile devices within a wireless telecommunications system, such mechanisms suffer significant inaccuracies. For example, a conventional location mechanism typically report an approximate location selected at random from a range of possible locations. However, these approximations may be inaccurate, inconsistent, or unreliable. In view of the foregoing, it may be understood that there are significant problems and shortcomings associated with current solutions and technologies for more accurately locating mobile devices within a wireless telecommunications system.

BRIEF DESCRIPTION OF DRAWINGS

In order to facilitate a fuller understanding of the exemplary embodiments, reference is now made to the appended drawings, in which like elements are referenced with like numerals. These drawings should not be construed as limiting the present disclosure, but are intended to be illustrative only.

DETAILED DESCRIPTION

Figure 1:
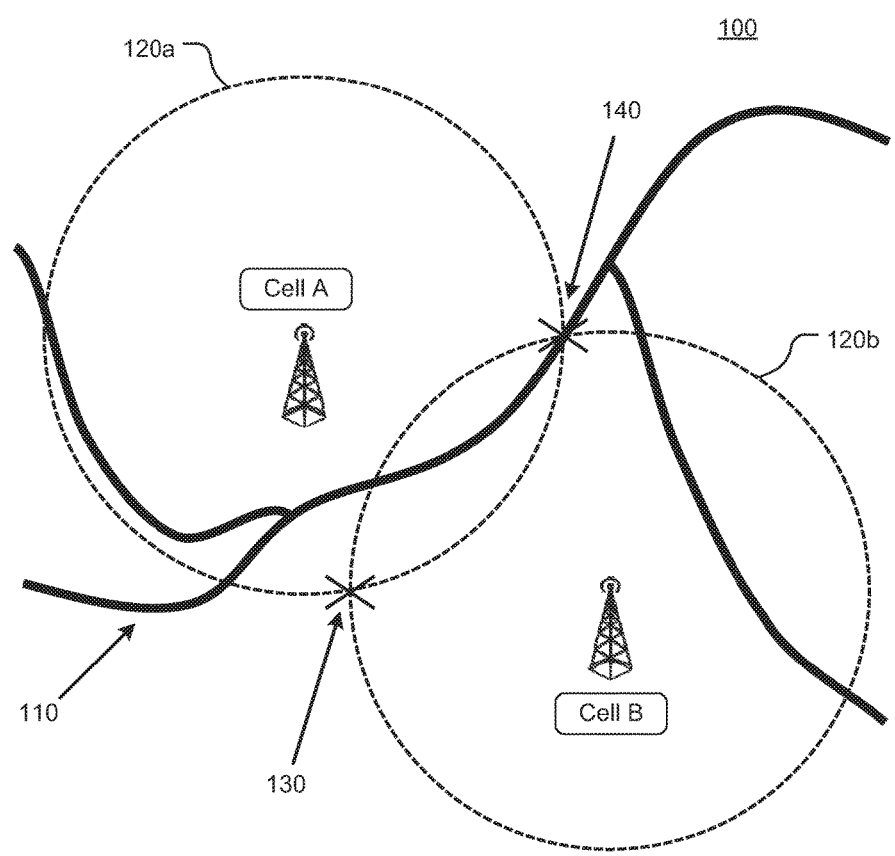
FIG. 1 depicts geographic map data with annotations, according to an exemplary embodiment.

Reference will now be made in detail to exemplary embodiments, examples of which are illustrated in the accompanying drawings. It should be appreciated that the same reference numbers are used throughout the drawings to refer to the same or like parts. It should be appreciated that the following detailed descriptions are exemplary and explanatory and are not restrictive.

Exemplary embodiments may provide a system and method for mobile network geolocation. That is, exemplary embodiments may, among other things, improve accuracy for locating base stations and/or mobile devices within wireless telecommunication cells using mobile network geolocation techniques.

Geographic map data may be used to assist in a geolocation system, e.g., a cellular mobile communications network. Geographic map data described herein, for example, may be a road network or subset thereof (e.g., a bus route, etc.). In some embodiments, a road network may be a travel path that is network-enabled (e.g., a UE may have connection to one or more networks along the travel path). The geographic map data may also be expanded to include other topological data, such as railways, coastlines, ferry routes, flight paths, and waterways (canals, rivers, lakes, etc.). It should be appreciated that that "travel path," "path," or "route," as used herein, may be network-enabled and used interchangeably with "road network" or "road."

Embodiments described herein may provide mobile network geolocation by using knowledge of geographic map data in combination with mobile communications network topological, signaling, and traffic data to geolocate a mobile station and/or user equipment (MS/UE) within the mobile communications network.

In order to provide mobile network geolocation, it may be determined that a user (or UE) is on a road network, or at least non-stationary. There may be a number of ways to achieve this. For example, in some embodiments, this may be achieved by monitoring the user or UE and determining that the user or UE is switching connection between cells. For example, this may take into account the geographic location of each identified cell that a UE passes through over time. In some embodiments, this may also be achieved by monitoring the communication between a UE and a network and determining that a general trend exists with regard to signal strength, which may provide a location of the UE, for example, within the cell (or providing a better resolution of the location of the UE). This may also be achieved by determining that a general trend exists with regard to propagation delay between the UE and one or more cells with which the communication exists. In some embodiments, there may be location estimates for the UE that may provide the necessary indication, either from the UE itself (e.g., based on GPS in the handset), or calculated by the network. Other various embodiments may be provided to determine that a user or UE is on a road network.

Once a decision has been made that road network information may assist in the geolocation of a particular user or UE, there may be several main scenarios to consider that are described below. These approaches described below may focus on examples based on using road network information. However, it should be appreciated that these methods may also use other features, e.g., rail routes where the user may be seen near one or more a railway stations, or use of coastline data to determine where multiple locations exists that on the UE may be more likely to be on land rather than sea.

A first main scenario is where a reasonably accurate estimate of the location of the UE is available, a GPS/GNSS fix may be provided. This may be achieved via "snap-to-road" or map-matching" techniques. Such techniques are described in "Some map matching algorithms for personal navigation assistants" by White et al., Transportation Research Part C 8 (2000) (http://www.researchgate.net/profile/Alain_Kornhauser/publication/222694469_Some_map_matching_algorithms_for_personal_navigation_assistants/links/0046352784f0c57b26000000.pdf), which is hereby incorporated by reference in its entirety. In general, precise location information may not be readily available, and even when it is, the number of location estimates available may be very limited and widely spaced in time.

A second main scenario is where a precise location may not be available for the UE, information available from two or more cells may be provided. Such information may include one-way or round-trip signal propagation delay between the UE and cells, radio signal power received at the UE from each of the cells detected (or monitored), or other similar information.

The available information may be translated into a distance estimate, or distance range, between the UE and each cell. With propagation delay, the translation may be straightforward based on that fact that delay may be related to distance and knowing the speed of light (or more precisely the speed of travel of electromagnetic radiation in a medium).

With power measurements, the translation may rely on a number of techniques, such as those described in U.S. Patent Publication No. 2013/0143588, entitled "System and Methods of Mobile Geolocation," filed Dec. 5, 2011, and U.S. Patent Publication No. 2013/0210449, entitled "Mobile Geolocation," filed Feb. 9, 2012, which are hereby incorporated by reference in their entireties.

Multiple mobile cells may be co-located on the same mast at the same location or not co-located on different masts. With a distance estimate from two or more cells sufficiently separated in location whose physical location is different, circles may be generated (or arcs if the cell has restricted, or directional, radial transmission) centered on each of the serving cells, the intersections of which may provide one or more candidate UE locations.

FIG. 1 depicts geographic map data with annotations 100, according to an exemplary embodiment. As shown in FIG. 1, there may be a road 110 with two different cells—Cell A and Cell B, each having respective coverage areas or distance circles 120a and 120b. The two distance areas may intersect at 130 and 140.

Figure 2A:
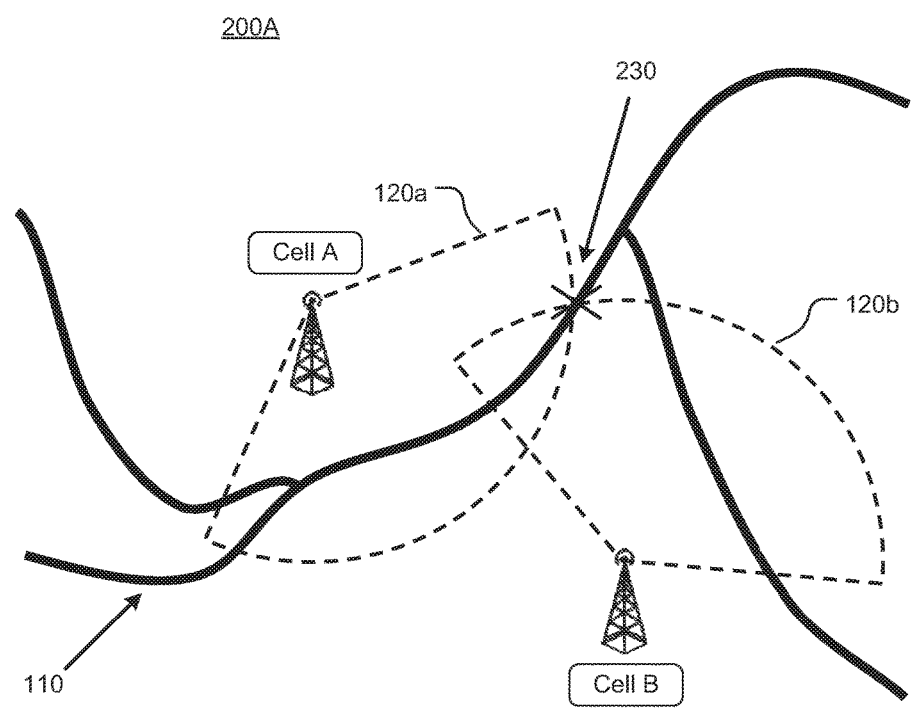
FIGS. 2A-2B depict geographic map data with annotations, according to an exemplary embodiment.

FIG. 2A depicts geographic map data with annotations 200A, according to an exemplary embodiment. As shown in FIG. 2A, there may be a road 110 with two different cells—Cell A and Cell B. Unlike FIG. 1, Cell A and/or Cell B may have transmission/reception directionality 220a and/or 220b, respectively, and therefore one intersection 230.

Figure 2B:
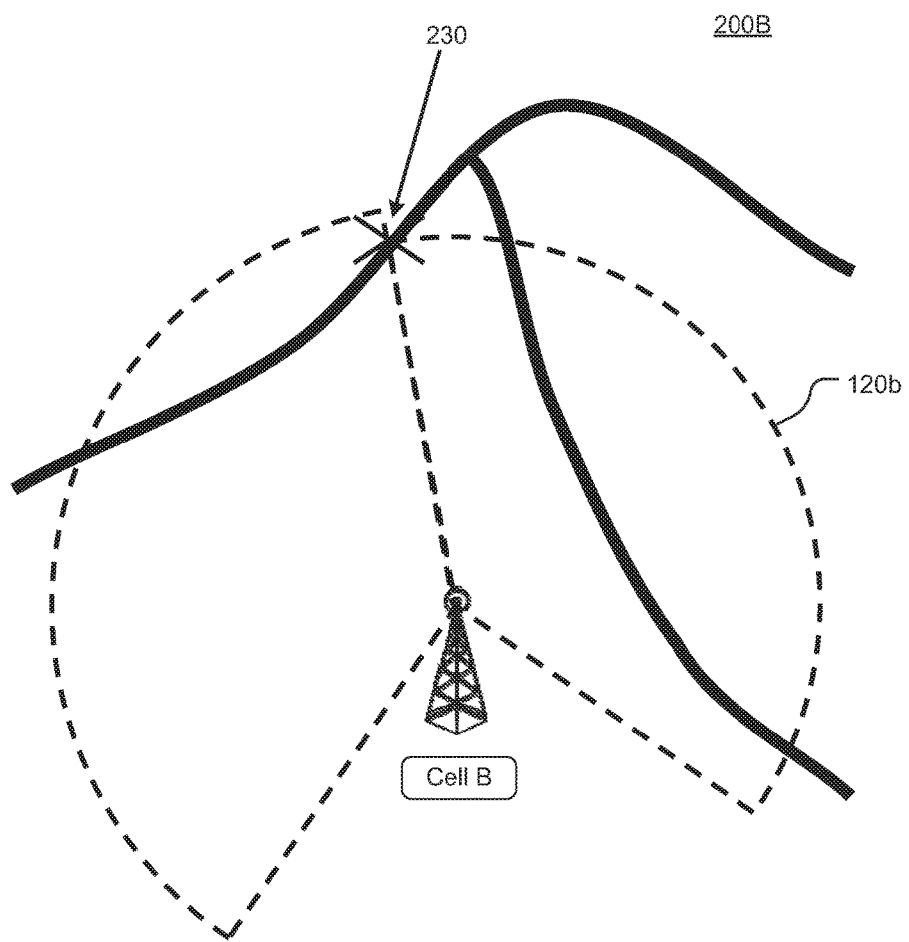

FIG. 2B depicts geographic map data with annotations 200B, according to an exemplary embodiment. If the locations of the cells are insufficiently separated, then the intersection point 330 may be considered as being close to the bisecting line between the two cells. In this case, the selected intersection point 330 may be taken as the minimum distance.

Figure 3:
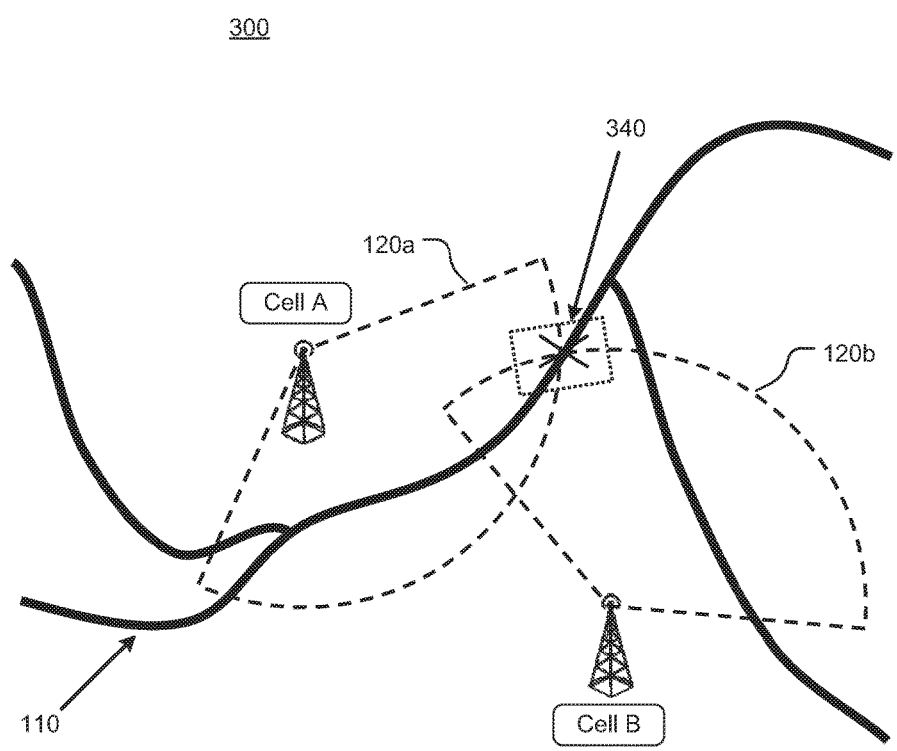
FIG. 3 depicts geographic map data with annotations, according to an exemplary embodiment.

FIG. 3 depicts geographic map data with annotations 300, according to an exemplary embodiment. Since the timing information may not be a precise indicator of distance, the candidate location may be considered an area 340, based on a distance range from each cell, rather than a specific point.

Figure 4A:
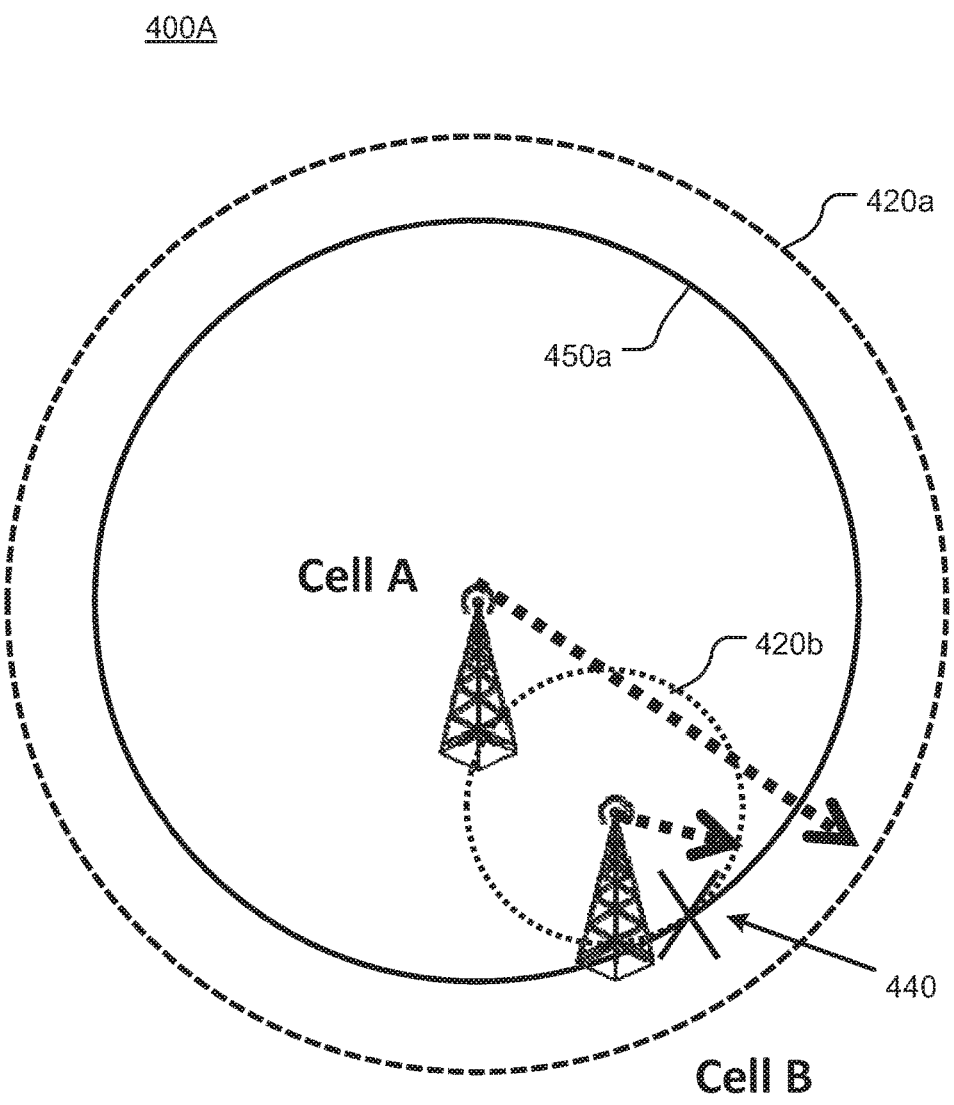
FIGS. 4A-4B depict corrected/augmented circles to indicate respective radii, according to an exemplary embodiment.
Figure 4B:
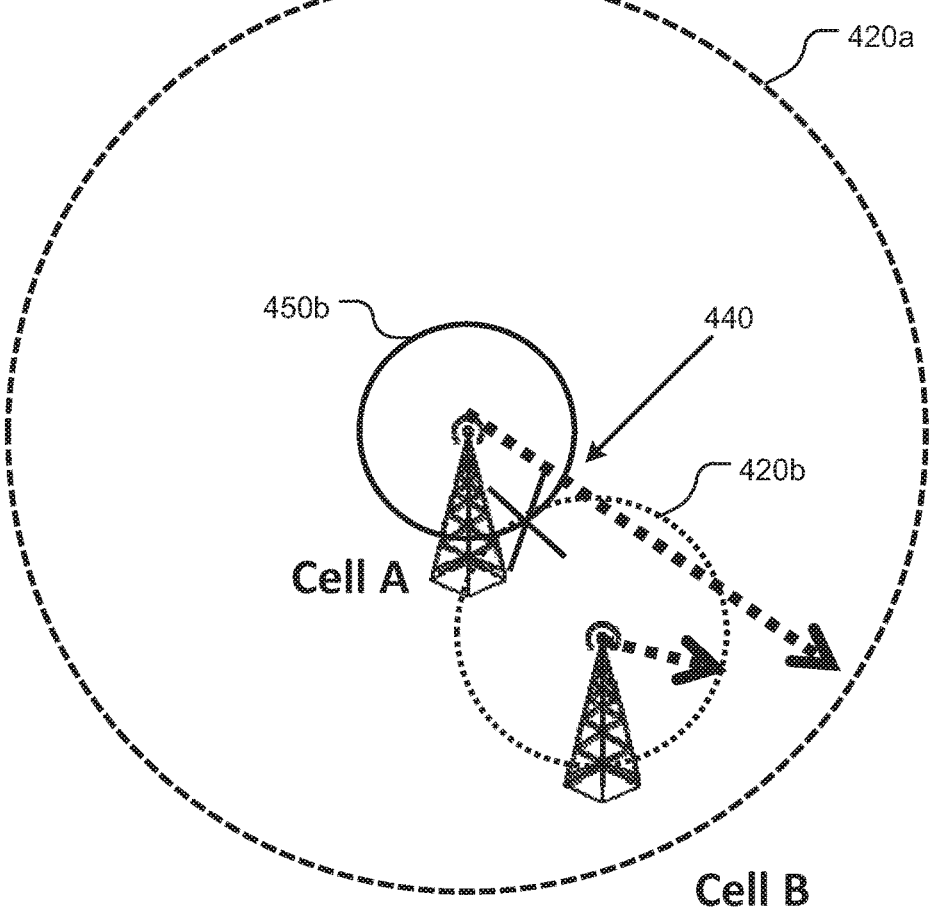

FIGS. 4A-4B depict corrected/augmented circles to indicate respective radii 400A-400B, according to an exemplary embodiment. Since there may be a time gap between the measurements associated with each cell, respective radii of the circles may be corrected/augmented to ensure overlap (e.g., as depicted in FIG. 4). Here, there may be two options (400A and 400B), where the dashed original circle 420a for Cell A may be shrunk/reduced to become the solid circle 450a to ensure overlap/intersection (440a for 400A and 440b for 400B) with the dotted circle 420b for Cell B. If the time gap is considered too large, for example, that set of measurements may be ignored. Of the two options, it should be appreciated that option 400A may be considered more favorable because it results in a key location that is in boresight of both cells (that is the direction of the antenna main transmit beam, as indicated by the dotted arrow for each cell). It should be appreciated that adjusting the smaller radius circle associated with the inner cell (e.g., Cell B) may also be provided.

Once candidate locations have been determined, associated road segments may be identified. In order to limit the number of road segments identified, limiting the candidate road types, for instance, by excluding minor or residential roads, may be provided.

Figure 5:
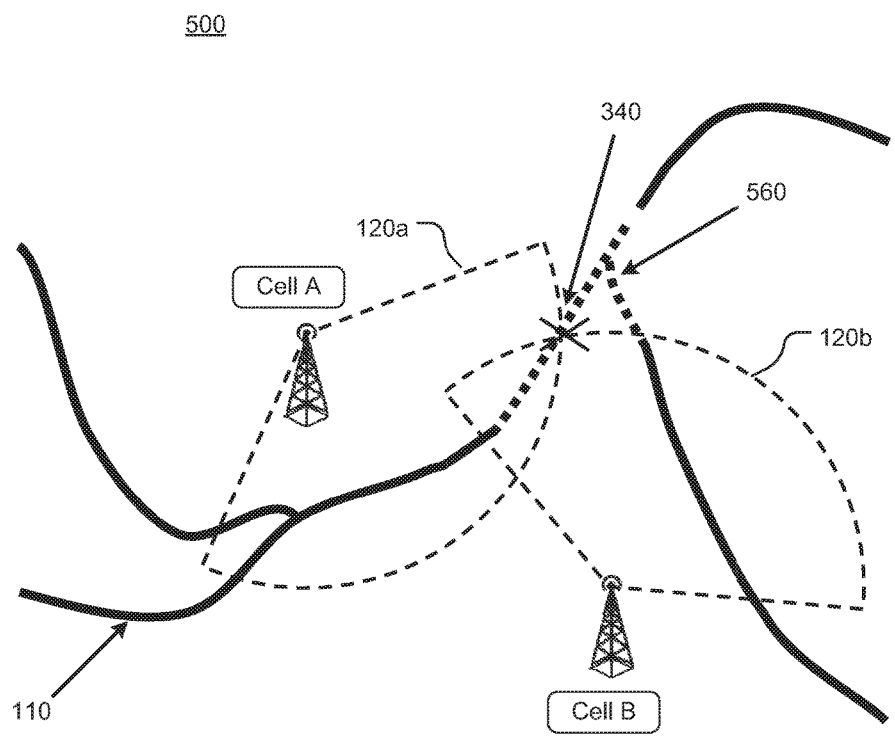
FIG. 5 depicts geographic map data with annotations, according to an exemplary embodiment.

FIG. 5 depicts geographic map data with annotations 500, according to an exemplary embodiment. As shown in FIG. 5, selected candidate road segments 560 may be highlighted. In some embodiments, the selected candidate road segments 560 may extend beyond the search radius because of the way in which they are defined in the source map data.

Figure 6:
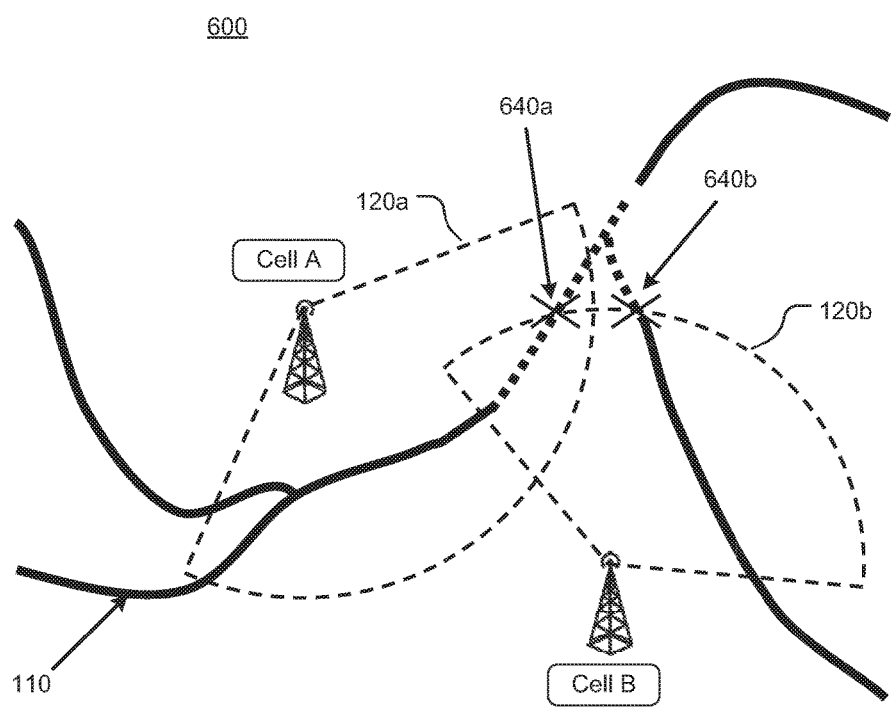
FIG. 6 depicts geographic map data with annotations, according to an exemplary embodiment.

FIG. 6 depicts geographic map data with annotations 600, according to an exemplary embodiment. In some embodiments, a revised candidate location set may be determined based on the selected road segments, or a subset of those segments, based on proximity to the original intersection point, for example, as shown in FIG. 6 by intersections 640a and 640b on the two selected road segments.

If the available data for a UE contains one intersection, one of the candidate locations on the road may be taken as the geolocation estimate, based on, for instance, the road type ranking (e.g. intersections on major roads trumping those on minor roads). However, if the UE undergoes multiple cell transitions with associated intersection points for each, then there may be further actions that may be applied in order to select the most likely candidate location at each transition point.

The embodiments described herein may be based on routing between the candidate locations in order to select the most likely candidate location at each transition point. The routing approach may be based on solutions to graph theory's shortest path problem, such as Dijkstra's algorithm or more powerful routing algorithms such as Contraction Hierarchies.

Figure 7:
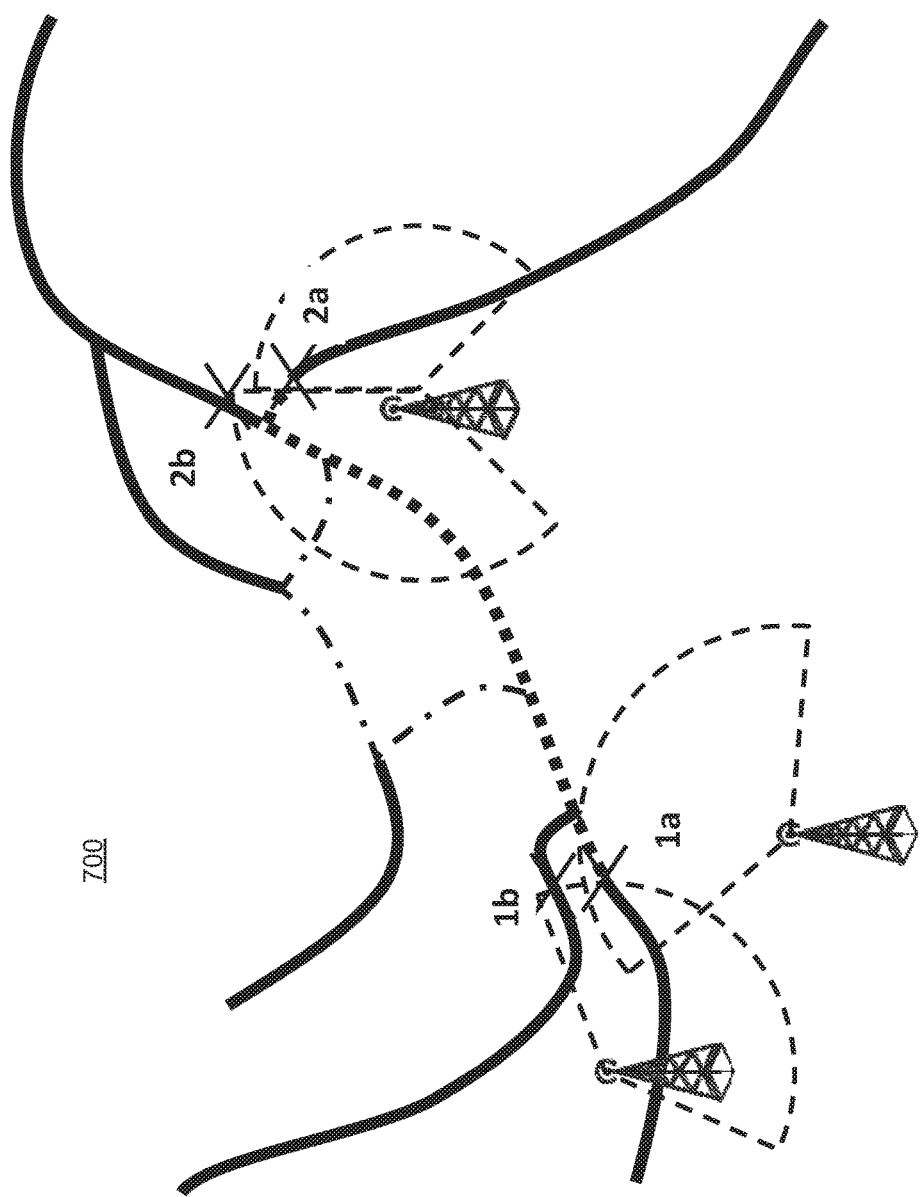
FIGS. 7-8 depict geographic map data with increasing routing options, according to an exemplary embodiment.
Figure 8:
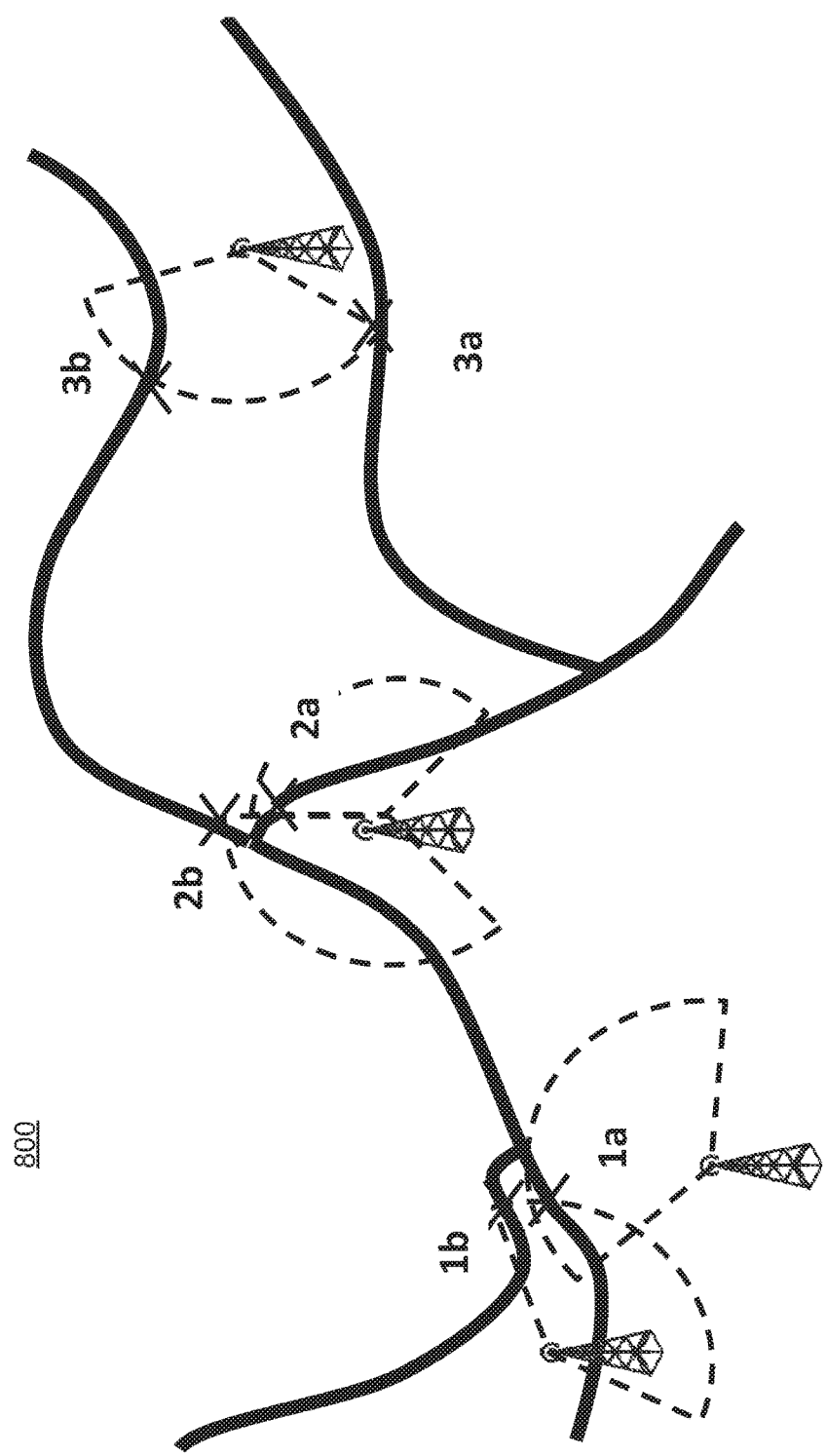

FIGS. 7-8 depict geographic map data with increasing routing options 700, according to an exemplary embodiment. As shown in FIG. 7, one such candidate route is depicted from transition 1 (start labelled as "1a") to transition 2 (end labelled as "2a"). A candidate route that would likely be excluded by the routing algorithm would be the one marked with a dash-dot-dash-dot, since that might be biased against due to its longer path length, or "cost." In practice, there may be many candidate road locations at each transition point and therefore multiple candidate routes that link one or more sets of candidate points associated with each transition.

Route Examples

Route 1: transition 1, road candidate a (1a) to transition 2, road candidate a (2a), as indicated by the dotted line along the road.

Route 2: 1a to 2b, Route 3: 1b to 2a, Route 4: 1b to 2b

As more transition points become available the number of routing options may increase, as shown in 800 of FIG. 8.

In order to select a route that may be most plausible given these restrictions, a proposed solution to the shortest path problem may be applied for a second time using "cost" associated with each route between transition points, e.g., 1a-2a. Then, the end-to-end route that may be most plausible may be selected as the one that minimizes the total cost between the start and end transition, traversing the preferred route of previously-determined routes between each transition assembling an end to end route. It should be appreciated that, in some embodiments, the second application of the shortest path algorithm may not select a new candidate route. Rather, it may simply select the best of the route fragments to assemble the best end to end route.

Figure 9:
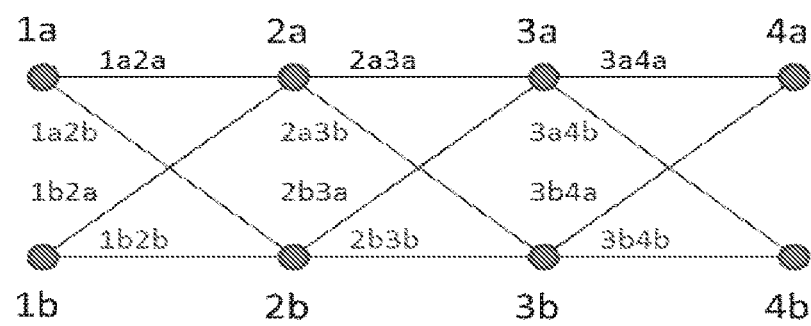
FIG. 9 depicts a tree diagram of routing options, according to an exemplary embodiment.

FIG. 9 depicts a tree diagram of routing options 900, according to an exemplary embodiment. For example, as shown in FIG. 9, there may be an option to select the minimum of {1a-4a, 1a-4b, 1b-4a, 1b-4b} when considering candidate route options between transition 1 and transition 4. The total cost would be the sum of all the intermediate costs. For example, if road candidate "a" was selected at every transition point the total cost would be 1a2a+2a3a+ 3a4a. In this example, a shortest path routing may first used to determine a set of routes between the candidate points associated with each transition and then the same algorithms may be used to determine the most likely (shortest) end-to-end path. This solutions-to-graph theory's shortest path problem may be considered a "double Dijkstra." Other various solutions or techniques may also be provided.

In some embodiments, an alternative to applying a "double Dijkstra" style approach may be to route through islands of connected selected road segments, which would likely be a smaller subset of all road segments.

Figure 10:
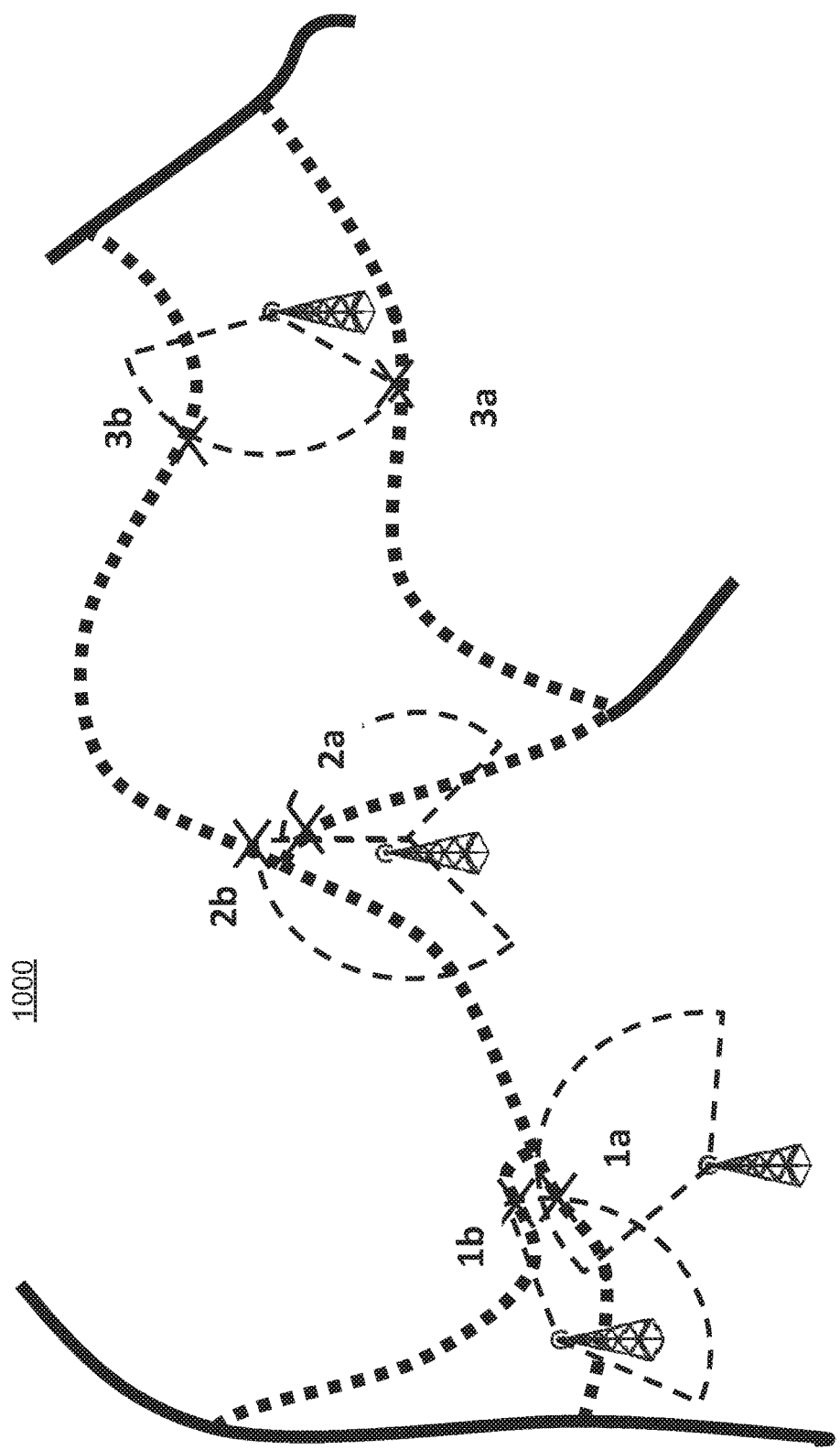
FIG. 10 depicts connected road segments selected based on candidate locations, according to an exemplary embodiment.

FIG. 10 depicts connected road segments selected based on candidate locations, according to an exemplary embodiment. For example, as shown in FIG. 10, the intersections 1a, 1b, 2a, 2b, 3a and 3b may result in an island of connected road segments, as indicated by the dotted road segments. In some embodiments, a shortest path problem may be employed to perform the routing between candidate end road segments, which may be associated with candidate locations 1a, 3a and 3b based on their timestamp in this example. The route offering the lowest overall "cost" may then be selected as the most likely end-to-end path, which may or may not include road segments associated with every intermediate candidate location. Other variations or criteria for selection may also be provided.

Once a most likely route has been determined, specific points along that route may be determined for each timestamp of interest for the UE, which may be described in the context of the third scenario below.

In a third main scenario, it may be assumed that information from only one (1) cell may be available. Also, it may be assumed that a first pass at geolocating the UE may have been made using techniques disclosed earlier, for which road information may or may not have been used in generating the estimate. It may also be assumed that an estimate of distance from the serving cell is available through, for example, a propagation delay estimate or other similar estimate of distance.

Figure 11A:
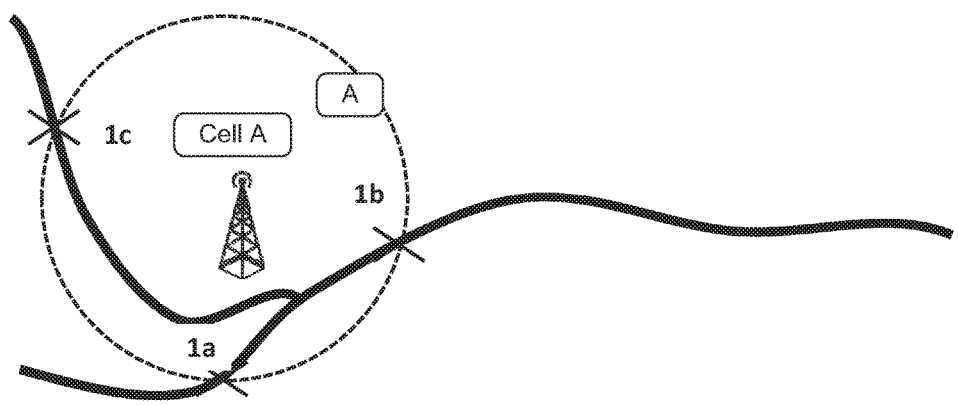
FIGS. 11A-11B depict geographic map data with annotations 1000A, according to an exemplary embodiment.

FIG. 11A depicts geographic map data with annotations 1100A, according to an exemplary embodiment. Similar to the second scenario, a circle may be created around the serving cell (Cell A) based on the UE distance estimate, as shown in FIG. 11A with several potential intersections 1a, 1b, and 1c with the roads, captured in sample A.

Without information from a second cell, there may be no intersection point derived from the distances from a pair of serving cells. However, there may still be a way by which the most likely intersection may be determined for the candidate road segments and the circle formed by the distance from a single serving cell. For instance, if there is first pass geolocation estimate, the road intersection closest to that may be selected. A check may also be made to favor road intersections that are within the antenna boresight of the serving cell. It should be appreciated that road type may also play a factor in this determination.

As further estimates of distance from serving cell become available, additional information may become available to aid in the process of selecting the most likely road intersection.

Figure 11B:
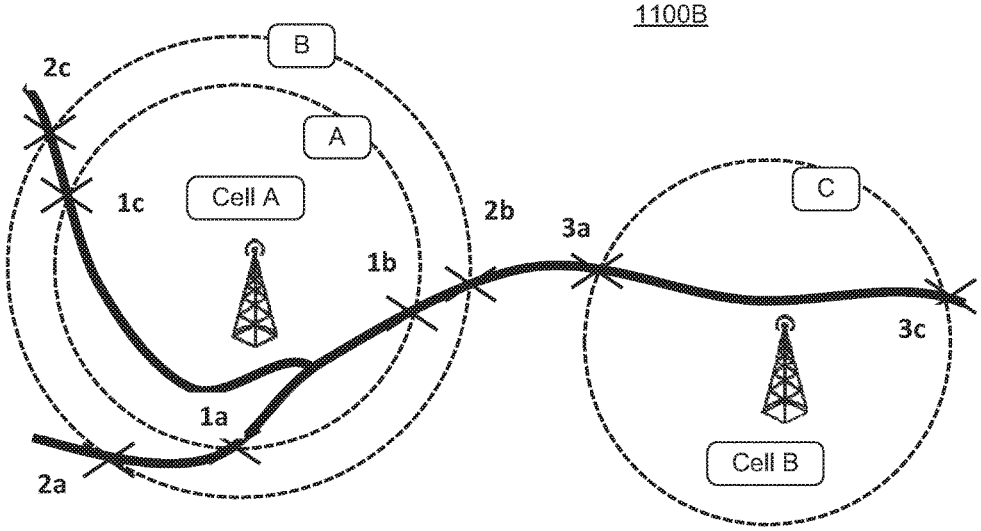

FIG. 11B depicts geographic map data with annotations 1100B, according to an exemplary embodiment. In FIG. 11B, samples A and B may highlight 6 road edges between them—1a, 1b, 1c, 2a, 2b, and 2c. Then, once sample C becomes available, additional road edges may be available—3a and 3c. Therefore, it should be appreciated that the UE may be travelling to the right on what is a dual carriageway, and that intersections 1b and 2b may be more likely. Road connectivity and identifier (e.g., name) may allow such assertions to be made. It should be appreciated that that most publically-available maps or geographical representations may represent two carriageways of a freeway or motorway as one or more single directional roads, which may allow advantage to be taken of more complex road topologies (e.g., split carriageways and junctions).

It should be appreciated that there may be many factors (potentially each with their own weighting) that could be used in determining the most likely intersection. It should be appreciated that various weighing techniques may be used. This may include machine-learning techniques and related analyses. In this example, such "contest indicators" may include:

Distance between candidate point and first pass estimate
Position and azimuth of serving cell with respect to candidate point
  May translate into off bore angle
Position and azimuth of reported neighbour cells with respect to candidate point
  May translate into off bore angle Position and azimuth of nearby cells on same carrier with respect to candidate point
   If they are expected to be reported at that candidate point but are not then counts against the point
Road network connectivity between previous chosen point and this candidate point (following the road network an only transitioning between road segments at known junctions).
Distance between previous chosen point and this candidate point
   As the crow flies and road distance
Incorporation of radio frequency data: channel quality indicator (CQI), Reference Signal Received Power (RSRP), Reference Signal Received Quality (RSRQ)
Class of road, e.g., highway versus residential road
Name of road (and name of roads bid for previous segment(s))
Road directionality, e.g. one-way streets and restrictions, e.g., private versus public roads
Type of district (urban, suburban, rural). Typically calculated for each area of a map by examining the road types and density in that and the immediately surrounding area
Previous visits to this road
Number of junctions taken this trip In some embodiments, machine-learning using the data described above, trained on known sets of locations following a set of known tracks (e.g., a test set of data where additional 'correct' location data may be obtained via GNSS/GPS), could be used to select the most likely road intersection, e.g., the winning intersection of the contest. Specifically, this may include selecting the most likely road edge based on decision trees and Bayesian networks, or other similar decision techniques and processes.

In the third main scenario, if multiple distance estimates (or ranges) are available for a particular UE, potentially from multiple cells, then advantages may be observed through smoothing the distance estimates (or ranges) before determining the exact road intersection point. The function driving the smoothing process may take advantage from factoring whether the UE's direction of travel is trending away from the serving cell, or towards it, and may include additional factors such as the time period during which this UE has been served by this cell and the corrections for being close or far from the cell and the characteristics of the area (rural/urban/suburban and therefore associated probability of multipath.

How this relates to the second scenario described above, in which the most plausible route may be determined, is that with a distance estimate from a serving cell intersections along that route may be determined. Since the route is determined, the number of intersections may be fewer. However, for every distance estimate there may be more than one intersection along the route and therefore the contest indicators also have to be applied. There may also be cases where the estimated distance may be too high or too small to intersect with the route, in which case the distance estimate may be further refined to ensure intersection.

A fourth main scenario may further employ techniques described in U.S. patent application Ser. No. 14/451,931, entitled "Techniques for Multiple Pass Geolocation," filed Aug. 5, 2015, which is hereby incorporated by reference in its entirety. Such techniques may be enhanced such that a component of the weighting factor for each candidate location may be based on distance of that candidate location from the nearest road, transit route or other appropriate map artefact. Hence, the method may use map information in addition to available information pertinent to geolocation (e.g., timing data, radio signal strength data), and may assign a preferential weight to candidate locations that are a shorter distance from the closest suitable roads, or coincident with roads, or other map artefacts than those that are more remote from the closest suitable map artefacts. The contribution to weight based on proximity to map artefacts may be in addition to the contribution from other information such as radio signal strength data, timing data and other information pertinent to geolocation. Hence, the enhanced technique may in general be more likely to select candidate locations that are close to roads than those that are more remote from roads. Similarly, map artefacts associated with a low likelihood of mobile presence, e.g., lakes, rivers, rugged terrain, etc, may in some embodiments be used to deprioritize certain locations, either in conjunction with weighting due to proximity to roads in instead of. In this case, those candidate locations that lie on those map features with low likelihood may be assigned a lower weight and be less likely to be chosen.

Figure 12:
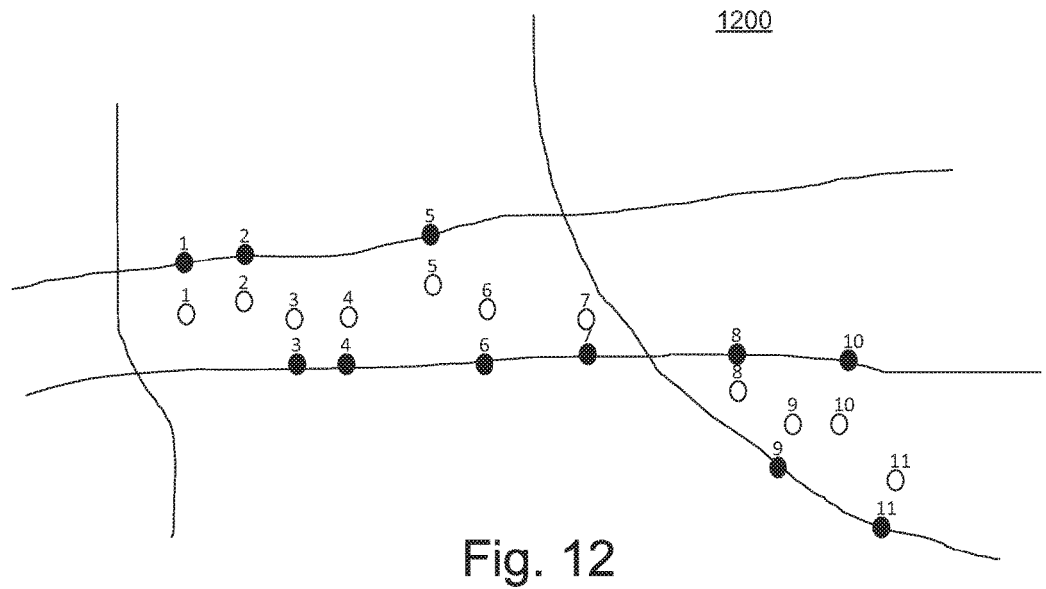
FIG. 12 depicts a candidate route that has a high penalty for road connectedness, according to an exemplary embodiment.

Another embodiment of this enhancement may include taking into account the degree of connectedness in selection of the candidate locations. FIG. 12 depicts a candidate route that has a high penalty for road connectedness 1100, according to an exemplary embodiment. Referring to FIG. 12, route 1200 shows the set of candidate locations selected to describe the route (hollow circles, numbered in time order) and the relevant roads in that vicinity (lines). For each of these candidate locations, the closest point on any of the appropriate roads are found (solid circles, numbered in time order.) This particular set of selected candidate locations, or route, may be assigned a score depending on the shortest path on roads between these closest points (solid circles.) In the case of FIG. 12, the assigned score may be low. This is because while the direct distance between consecutive solid circles 2 and 3 is relatively short, to travel between them using roads may be much longer. Similarly the effective road distance between solid circles 4 and 5, between 5 and 6, between 8 and 9, between 9 and 10 and between 10 and 11 all involve a significantly longer distance than the direct distance because they involve indirect travel along the road networks.

Figure 13:
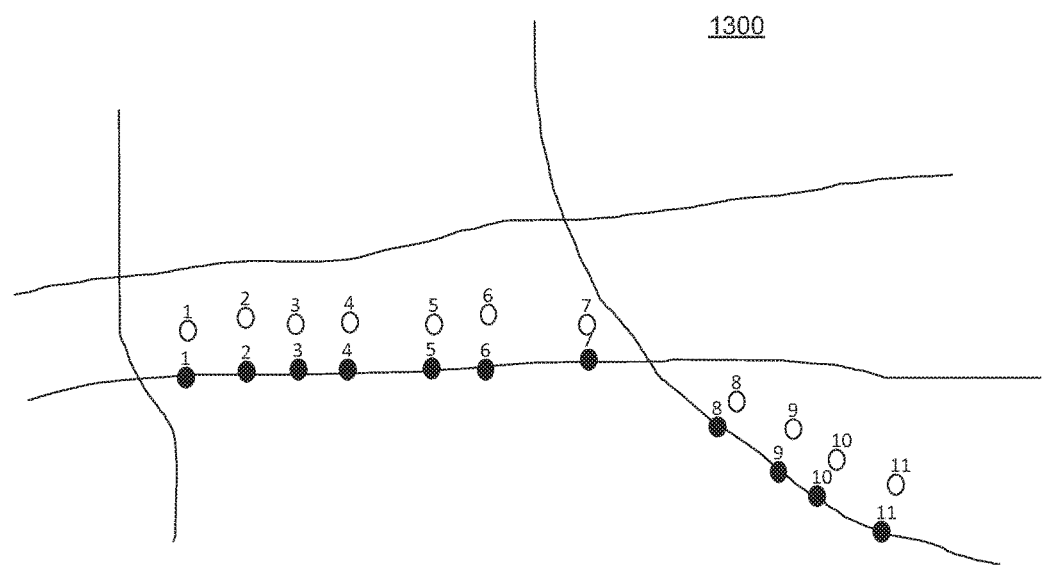
FIG. 13 depicts a candidate route that has a low penalty for road connectedness, according to an exemplary embodiment.

In contrast, FIG. 13 depicts a candidate route that has a low penalty for road connectedness 1300, according to an exemplary embodiment. For example, FIG. 13 shows another set of selected candidate locations and the closest points on the road network. This time the set of chosen candidate locations may be assigned a higher score as the distance required to travel on the road network between the solid circles is significantly shorter and closer to the direct distance between the solid circles. It should be appreciated that metrics other than the road distance may be used in place of or in addition to the road distance. For example, factors such as the speed required to traverse the route on the road and the corresponding speed limits may be used to contribute to the score. Similarly, the number of "U-turns" required to traverse the route, the number of duplicate passes down the same section of road, etc., may be used to contribute to the score. The score that a particular set of candidate locations has been assigned may be employed to improve the geolocation in various ways. For example, a multiple pass technique may be used. In this example, multiple passes of the geolocation may be used until this connectedness score is sufficiently low, with the route chosen on each pass being used to weight and select candidate locations on the next pass. Another alternative uses a searching algorithm to select from the candidate locations. The objective of the searching algorithm may be to reduce the total penalty of all the candidate locations chosen and also to reduce the score for the route connectedness. A variety of searching algorithms may be appropriate applied here, such as evolutionary algorithms, genetic algorithms, simulated annealing, particle swarm optimization, greedy search, exhaustive search, hill-climber search, and others.

Figure 14:
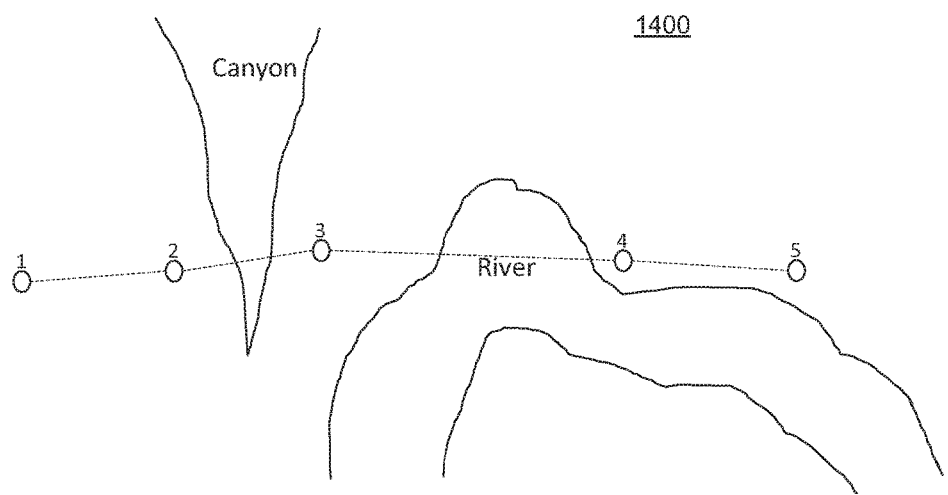
FIG. 14 depicts a candidate route that has a high penalty for road connectedness, according to an exemplary embodiment.

Another embodiment of this enhancement may concern the prohibition of crossing barriers or ingress into areas that are unlikely to be entered (unless the UE is travelling at such a high observed velocity as to be determined airborne). FIG. 14 depicts a candidate route that has a high penalty for road connectedness, according to an exemplary embodiment. Referring to FIG. 14, route 1400 shows a selection of candidate locations such that the route crosses a canyon and a river. This is considered unlikely compared to routes that bypass these natural barriers. A penalty may be assigned to the route such that the selection of routes that cross natural or artificial barriers is discouraged. Coastlines may be processed in a similar way, and map feature meta-data could even be considered (e.g., a maps marker of sailing club might raise the probability that a lake is traversed). In the case of FIG. 13 the route is assigned a high penalty.

Figure 15:
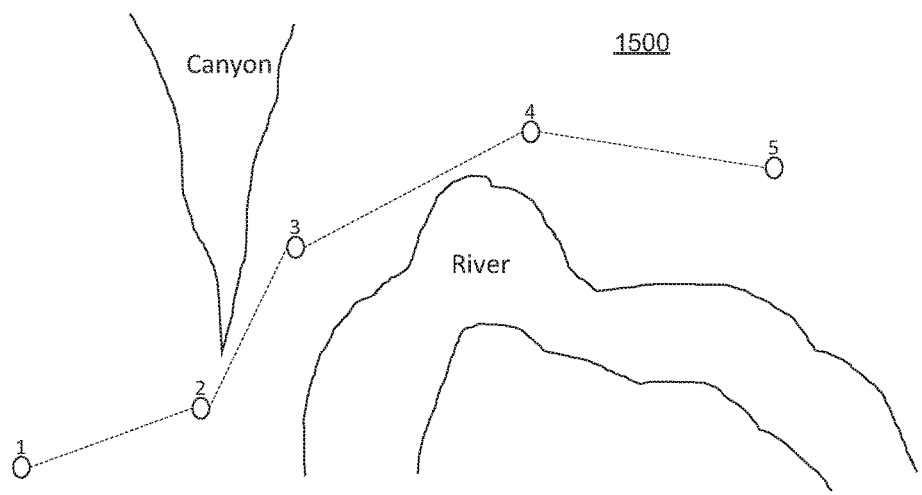
FIG. 15 depicts a candidate route that has a low penalty for road connectedness, according to an exemplary embodiment.

In contrast, FIG. 15 depicts a candidate route that has a low penalty for road connectedness 1500, according to an exemplary embodiment. For example, the route 1500 in FIG. 15 does not traverse barriers and thus is assigned a low or zero penalties for crossing barriers. These barriers may include a variety of natural and artificial barriers such as rivers, canals, other waterways, lakes, swamps, canyons, ravines, cliffs, dense undergrowth, highways and motorways railways, tramways, private land, etc. Exceptions to these barriers may exist for example in the form of bridges, road intersections, tunnels, railway crossings, etc. Traversal in the vicinity of these attracts a low score. The score that a particular set of candidate locations has been assigned may be employed to improve the geolocation in various ways. For example, a similar multiple pass technique described above may be used.

It should be appreciated that the use of proximity to roads, road connectedness of selected points, crossing barriers, and ingress into prohibited areas may be used to generate penalty scores for selection of routes in isolation or in any combination.

A fifth main scenario is where the series of locations describing the route for a UE is found by building sequences of connected road segments and selecting the sequence that best describes the available information pertinent to geolocation. This operates with candidate route fragments. These are groups of road segments that are connected; that is that they contain no breaks and it is possible to travel between any road segment in the candidate route fragment to any other road segment in the candidate route fragment by travelling only on road fragments in that candidate route fragment.

In one embodiment an initial set of candidate route fragments is created such that each candidate road segment is consistent with a single piece of UE data or a small portion of UE data pertinent to geolocation. This set of candidate route fragments may be created by a variety of means, for example exhaustively or by random creation of route fragments. In one embodiment this initial set of candidate route fragments is found using an estimate of the distance of the UE from a serving cell such that road fragments that are within a suitable tolerance of that distance from that cell are included in the initial set. In another embodiment this initial set of candidate route fragments is found using an estimate of the distance of the UE from each of two or more serving cells at the same or approximately the same time such that road fragments that are within a suitable tolerance of those distances from the appropriate cells are included in the initial set.

Once a set of candidate route fragments is available then the plausibility of each route fragment in that set is evaluated by some means. In one embodiment this may be evaluated by how consistent the route fragment is with one or more aspect of the available information pertinent to geolocation. In one embodiment this may be achieved by considering trends in available information pertinent to geolocation. For example, if that information shows that the distance of the UE from a serving cell is increasing as time progresses then those routes that, if traversed by the UE, would result in an increase in the distance from the serving cell, then that route fragment may be assigned a higher score. In contrast those routes that, if traversed by the UE, would result in a decrease in the distance from the serving cell, or the distance from the serving cell remaining essentially the same, then that route fragment may be assigned a lower score. By assigning scores to each route fragment on the basis of how well they describe the available information pertinent to geolocation, the route fragment or fragments in the set of candidate route fragments that achieve the best score may be selected and extended. In being extended, new road segments are added to the route fragment such that the fragment retains connectivity; that is there are no breaks in the fragment. This results in one or more new route fragment(s). These new fragment or fragments are added to the set of candidate road fragments. In some embodiments the original road fragment used to generate the new route fragment or fragments is removed from the set of candidate road segments as the new candidate routes fragments are added. Any new candidate road fragments added to the set of candidate road fragments may have a score assigned based on consistency with the UE measurements in the same way that other members of the set of candidate road fragments have been assigned scores. Thus at any time, the candidate route fragment or fragments best describing the available information pertinent to geolocation may be selected and extended to create new candidate route fragment or fragments. If one or more candidate route fragment is found to completely describe the available information pertinent to geolocation then it may be regarded as a plausible route for that UE and chosen to be used to generate geolocations for that UE.

In some embodiments candidate route fragments may include expression of the sequence in which the component road segments are traversed. In this case the ordering is taken into account when considering the consistency of that candidate route fragment with the available information pertinent to geolocation, and hence the score assigned to that candidate route fragment. In some embodiments some components of the route fragment may be included more than once in a single route fragment. This allows for example "U-turns" and duplicate passes down the same section of road, etc. to be included in the route fragment.

Figure 16:
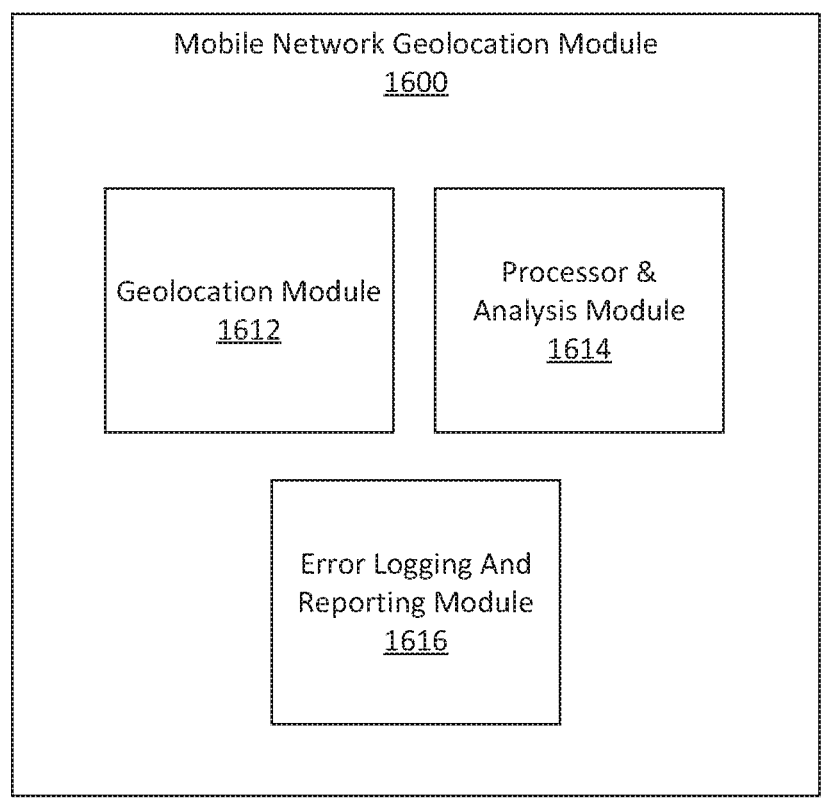
FIG. 16 illustrates a mobile network geolocation module, according to an exemplary embodiment.

FIG. 16 illustrates a mobile network geolocation module, according to an exemplary embodiment. Referring to FIG. 16, there is shown a mobile network geolocation module 1610 in accordance with an embodiment of the present disclosure. As illustrated, the mobile network geolocation module 1610 may contain one or more components including geolocation module 1612, processor and analysis module 1614, and error logging and reporting module 1616.

The description below describes network elements, computers, and/or components of a system and method for mobile network geolocation that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Geolocation module 1612 may be used to determine geolocation or geolocation-derived data associated with a mobile device. For example, such information may include, but not be limited to, propagation delay measurements, signal strength measurements, or other geolocation or geolocation-derived data. Furthermore, this information may be used in conjunction with satellite-based navigational measurements, such as GPS (Global Positioning System), GLONASS (Global Navigation Satellite System), Galileo (European-based satellite navigation), or other similar data, however the techniques described above are intended for where GPS data is not continuously available (e.g. if not installed, or prohibitive short battery life).

It should be appreciated that the geolocation module 1612 may perform one or more geolocation techniques in accordance with embodiments described herein and/or at least the following: U.S. Patent Publication No. 2011/0319093 to Flanagan, entitled "Geo-location in a Wireless Communication Network," filed on Sep. 19, 2011 and published on Dec. 29, 2011; U.S. Pat. No. 8,374,596 to Thiel et al., entitled "Method and Apparatus for Deriving Pathloss Estimation Values," filed on Dec. 21, 2009 and issued on February 2013; U.S. Patent Publication No. 2013/0210450 to Kenington et al., entitled "Method and Apparatus for Geolocating Wireless Communication Unit," filed on Feb. 9, 2012 and published on Aug. 1, 2013; U.S. Patent Publication No. 2013/0210449 to Flanagan, entitled "Mobile Geolocation," filed on Sep. 19, 2011 Feb. 9, 2012 and published on Aug. 1, 2013; U.S. Patent Publication No. 2014/0171102 to Murphy et al., entitled "Mobile Geolocation," filed on Dec. 18, 2012 and published on Jun. 19, 2014; and U.S. Patent Publication No. 2014/0171103 to Murphy et al., entitled "Method and System for Mobile Reference Signature Generation," filed on Dec. 18, 2012 and published on Jun. 19, 2014, all of which are herein incorporated by reference in their entireties. It should be appreciated that such information and data may be transmitted and/or received in real-time, near real-time, or from historical storage units. For example, a mobile device may send a radio link failure report (RLF) that contains information about an event in the past where the mobile device lost service. Such information may not immediately be reported or may be stored for future retrieval/transmission.

Processor and analysis module 1614 may be used to processing all (or a subset) of the chosen estimates for all (or the subset of) call segments of the plurality of call segments to identify one or more geolocation estimates under consideration. In some embodiments, this may entail performing one or more smoothing and/or post-smoothing techniques, as described herein. The processor and analysis module 1614 may also facilitate comparisons of the plurality of potential candidate locations with results from the smoothing analysis, and help identify discrepancies. For example, if such discrepancies meet a predefined discrepancy threshold, the one or more geolocation estimates under consideration may be identified. The processor and analysis module 1614 may then choose to discard, disregard, or otherwise relegate less important these potential candidate locations that are associated with the identified discrepancies. The processor and analysis module 1614 may be used to further refine the one or more geolocation estimates under consideration to ultimately improve geolocating one or more mobile devices within a network.

Error logging and reporting module 1616 may produce logs, reports, or other information associated with improving allocation of network resources using geolocation and handover management. It should be appreciated that any or all of these modules 1610-1616 may be communicatively coupled to one or more databases or storage/memory units (not shown), locally or remotely, so that information may be stored for later use or processing.

Figure 17:
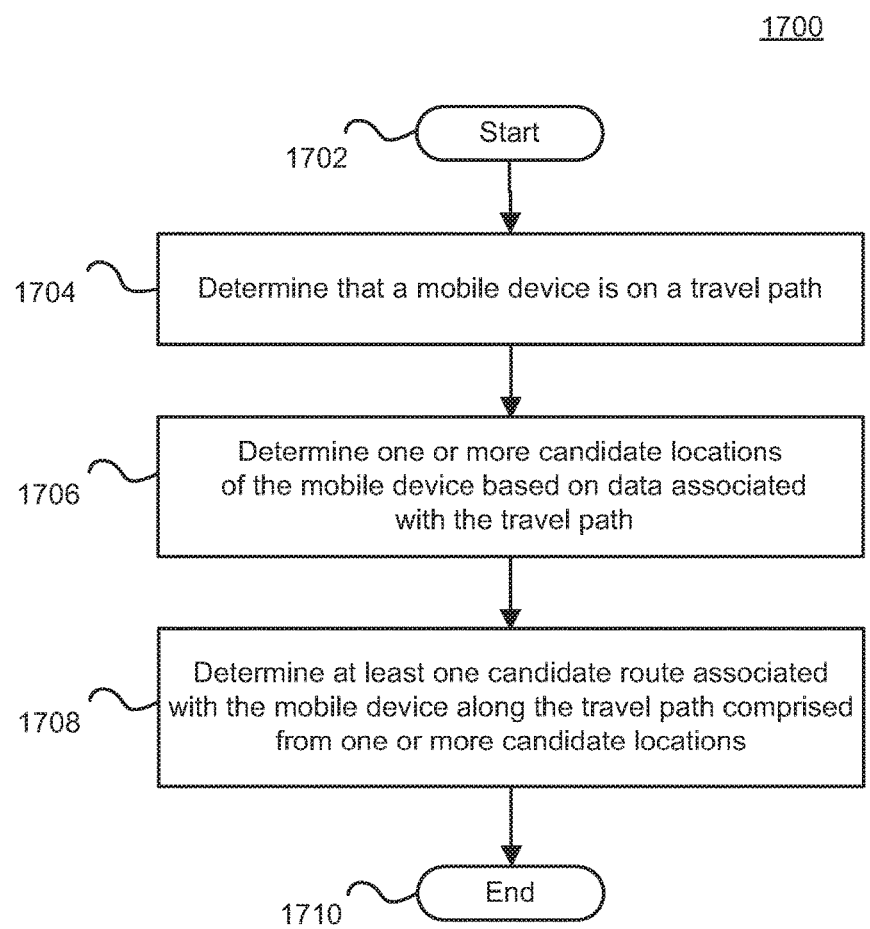
FIG. 17 illustrates a flowchart of a method for mobile network geolocation, according to an exemplary embodiment.

FIG. 17 illustrates a flowchart of a method for mobile network geolocation, according to an exemplary embodiment. The exemplary method 1700 is provided by way of example, as there are a variety of ways to carry out methods disclosed herein. The method 1700 shown in FIG. 17 may be executed or otherwise performed by one or a combination of various systems. The method 1700 is described below as carried out by at least the systems, configurations, diagrams, schematics, and modules in FIGS. 1-16, by way of example, and various elements of module 1600 are referenced in explaining the exemplary method of FIG. 17. Each block shown in FIG. 17 represents one or more processes, methods, or subroutines carried out in the exemplary method 1700. A non-transitory computer-readable medium comprising code, which when performed by a computer may perform the acts of the method 1700 may also be provided. Referring to FIG. 17, the exemplary method 1700 may begin at block 1702.

At block 1704, a mobile device may be determined to be on a travel path. In some embodiments, the travel path may be a non-stationary path. For example, this may comprise a road, path, cycle-way, byway, bus-route, tram-route, railway, flight path, waterway, transportation route, or other route or path.

In some embodiments, determining that a mobile device is on a travel path may be based on monitoring communications between the mobile device and a network, and determining general trend with regard to signal strength. In some embodiments, determining that a mobile device is on a travel path may be based on determining that a general trend exists with regard to propagation delay between the mobile device and one or more cells with which communication exists. In some embodiments, determining that a mobile device is on a travel path may be based on location estimates for the mobile device based on information from the mobile device or the network.

At block 1706, one or more candidate locations of the mobile device may be determined based on data associated with the travel path. In some embodiments, the data associated with the travel path may be geographic map data. In some embodiments, determining one or more candidate locations of the mobile device may be further based on map-matching analysis, location estimates, information from two or more cells, or a combination thereof. It should be appreciated that the information from two or more cells may comprise signal propagation delay between the mobile device and cell, radio power measurements, distance estimates, geographical map data, or other similar data, or a combination thereof.

At block 1708, at least one candidate route associated with the mobile device may be determined along the travel path comprised from a series of candidate locations.

It should be appreciated that the method 1700 may further comprise determining cell intersection candidate locations for the mobile device. This may be based on two or more distance estimates.

It should be appreciated that the method 1700 may also comprise developing at least one candidate route associated with the mobile device along the travel path based on one or more candidate locations. In some embodiments, developing at least one candidate route may comprise a routing process, wherein the routing process comprises utilization of a solutions to graph theory's shortest path problem applied in an iterative manner. In some embodiments, developing at least one candidate route may comprise a routing process, wherein the routing process comprises utilization of solutions to graph theory's shortest path problem applied in an iterative manner. At block 1710, the method 1700 may end.

It should be appreciated that, in some embodiments, an optional "smoothing" action may be provided to change the locations chosen for a UE as time progresses so that they follow a trajectory that has fewer sudden changes in direction, velocity, speed or other similar characteristics. For example, in some embodiments, each candidate location of the chosen route may be "snapped" to the nearest road. A smoothing function may then be applied to each of these snapped locations. There may be a variety of techniques used to achieve the smoothing, such as a Loess smoother, double exponential smoother, etc. Finally, once the smoothing has been applied, the smoothed locations may then be snapped to the closest point to the smoothed location that lies on a road. This approach may allow smoothing to be applied, while ensuring that the resulting locations lie on the roads.

It should also be appreciated that, in some embodiments, for reason of computation efficiency, the map information used for geolocation may be stored in two or more discrete portions, where each portion may be mapped to some characteristic or characteristics of the UEs to be geolocated. For example, the map data may be placed into portions based on the geographical area, such as polygonal tiles, arbitrary shapes, political boundaries, coverage areas of cells, or any other appropriate groupings. In some embodiments, there may be some overlap between the portions such that each unit of map information may appear in more than one portion. In other embodiments the portions may be disjoint so that each unit of map information appears in only one portion. The data corresponding to the UEs that are to be geolocated may then be partitioned into groups that have the same characteristic or characteristics as the portions of map information. In this way, the UE data for geolocation may be processed in discrete groups where in general only a subset of the portions of the map information is needed for each group of UE data. These groups may be processed in parallel on separate processing units such as physical computers, virtual computers, processors or threads, where each processing unit may only need to store in memory a subset of the portions of map information. In some embodiments, the groups of UE data may be processed sequentially in time, or in some combination of parallelization between processing units and sequentially in time. This may have the advantage that the memory requirement of each processing unit is reduced, the number of portions of map information that need to be loaded is reduced or other advantages that lead to lower cost of computation equipment, more efficient processing, faster processing or other similar advantage.

It should be appreciated that the techniques described herein may provide improvement in geolocation accuracy for mobile devices, relative to conventional coverage patterns, which are based upon reported BTS locations.

While embodiments may be based upon propagation delay measurements or signal strength based contours for which mobile devices are located, it should be appreciated that contours or shapes created based on other techniques may also be provided. For example, GPS-based measurements may provide helpful information and/or shapes to locate mobile devices.

An advantage of the techniques described herein is that while an approximate location may be obtained by selecting at random from a range of possible locations, a more refined approximation may be made in using geographic map data. Further, the use of additional processing techniques, such as smoothing or post-smoothing analysis, may provide greater location approximation accuracy and/or plausibility.

It should be appreciated that base stations or BTS, as described herein, may include radio transceivers that define a cell and may coordinate radio-link protocols with mobile devices. A base station may also provide a networking component of a mobile communications system from which signals are sent and received. A base station may be controlled and monitored by one or more Base Station Controllers (BSC) to provide communication over a network. The network may be the Internet or one or more other networks utilized for connecting various network providers and/or clients and allow for mobile communications between various mobile communications devices. As described above, a base station may comprise configuration parameters that control various aspects of a cell site, where each of these parameters may be altered to change network behavior, based on observations of both the base station itself, measurements at the mobile station or handset, or other acquired or generated data. In addition, a base station may include a small cell, such as a femtocell, picocell, microcells, or other device that uses distributed radio technology to enhance network coverage area.

Mobile devices, as described herein, may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile devices 110A-110G may be used independently or may be used as an integrated component in another device and/or system (e.g., an automobile).

It should be appreciated that a base station, as described herein, may be connected to a variety of other backend systems. In order for the systems, configurations, and modules, as described herein, to provide various services to its subscribers, a base station via the BSC may be communicatively coupled to one or more servers which in turn may access a variety of databases. These databases may store a variety of information. For example, the databases may store information that identifies subscribers using its service and for which service features are subscribed. The databases may store information, such as a subscriber's customer name, identification number, services, or other identifiers, and/or whether a user's mobile devices is switched on or off. It should be appreciated that these databases may be highly robust and may further store geolocation information, geolocation-derived information, and other information suitable for estimating a coverage area for a DAS or repeater system.

It should be appreciated that the contents of these databases may be combined into fewer or greater numbers of databases and may be stored on one or more data storage systems and in more than one formats. The data storage systems may be local, remote, or a combination thereof to clients systems, servers, and/or other network components. Information stored in the databases may be useful in, for example, locating a mobile device within a coverage area, and/or other related services.

Communication between the various base stations, mobile devices, service providers and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice Over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE), Voice over LTE (VoLTE). Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, etc., or via protocols for a wired connection, such as an IEEE Ethernet 802.3.

By utilizing a mobile network geolocation approach using geographic map data, a more reliable way to geolocate mobile devices within wireless telecommunication networks may be achieved.

In addition to the benefits described above, embodiments of the system and method for mobile network geolocation not only provide an effective and improved technique for locating mobile devices in such systems, but also may allow service providers the ability to provide better service to a larger subscriber pool since. Moreover, advantages in network optimization may also be apparent. Providing such a technique for better locating mobile devices within a telecommunication network may maximize network resource allocation if the locations of mobile devices are more accurately tracked, and the local geography better understood (e.g., different strategies may be deployed to optimize the radio network if the locality may be recognized as urban, residential, flat, mountainous, or other geographical topography, elevation, or terrain). Furthermore, advertisement and marketing opportunities may also be available. With knowledge of the location of a UE, more relevant advertisements and other commercial information may also be presented to one or more subscribers.

While the features and functionalities for mobile network geolocation are primarily discussed with respect to the embodiments above, it should be appreciated that the features and functionalities of one embodiment may be similarly applied to other embodiments. Furthermore, although the embodiments described above do not require the use of GPS technology or other location services, it may be readily appreciated that the features and functionalities described herein may be used in conjunction with GPS or other location-based technologies as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that estimating a mobile device location in a mobile network geolocation system in accordance with the present disclosure as described above typically involves the processing of input data and the generation of output data to some extent. This input data processing and output data generation may be implemented in hardware or software. For example, specific electronic components may be employed in a coverage area estimation module or similar or related circuitry for implementing the functions associated with for mobile network geolocation in accordance with embodiments described above. Alternatively, one or more processors operating in accordance with instructions may implement the functions associated with for mobile network geolocation in accordance with embodiments as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method, comprising:
   determining, by a device, that a mobile device undergoes multiple cell transitions;
   determining, by the device and for each cell transition of the multiple cell transitions, a plurality of candidate locations of the mobile device based on mobile communications data associated with at least two cells;
   obtaining, by the device, geographic map data indicating at least one travel path;
   assigning, by the device, a score to each of a plurality of sets of candidate locations based on a distance to travel on the at least one travel path between candidate locations in a respective set of candidate locations,
each of the plurality of sets of candidate locations including a candidate location for each cell transition of the multiple cell transitions; and
determining, by the device, a route along the at least one travel path and associated with the mobile device based on the scores assigned to the plurality of sets of candidate locations.

2. The method of claim 1, where assigning the score includes:
assigning the score based a speed to traverse the at least one travel path between candidate locations in the respective set of candidate locations.

3. The method of claim 2, where the speed is determined based on at least one speed limit corresponding to the at least one travel path.

4. The method of claim 1, where assigning the score includes:
assigning the score based on at least one of:
a number of U-turns required to traverse the at least one travel path between candidate locations in the respective set of candidate locations, or
a number of duplicate passes down a same section of the at least one travel path required to traverse the at least one travel path between candidate locations in the respective set of candidate locations.

5. The method of claim 1, further comprising:
selecting a set of candidate locations, from the plurality of candidate locations, to be assigned the score based on the score assigned to a previous set of candidate locations.

6. The method of claim 1, further comprising:
selecting a set of candidate locations, form the plurality of candidate locations, using a searching algorithm that reduces a total road connectedness penalty of all candidate locations in the set of candidate locations.

7. The method of claim 6, where the searching algorithm includes at least one of:
an evolutionary algorithm,
a genetic algorithm,
simulated annealing,
particle swarm optimization,
greedy search,
exhaustive search, or
hill-climber search.

8. A device, comprising:
one or more processors to:
determine that a mobile device undergoes multiple cell transitions;
determine, for each cell transition of the multiple cell transitions, a plurality of candidate locations of the mobile device based on mobile communications data associated with at least two cells;
obtain geographic map data indicating at least one travel path;
assign a score to each of a plurality of sets of candidate locations based on a distance to travel on the at least one travel path between candidate locations in a respective set of candidate locations,
each of the plurality of sets of candidate locations including a candidate location for each cell transition of the multiple cell transitions; and
determine a route along the at least one travel path and associated with the mobile device based on the scores assigned to the plurality of sets of candidate locations.

9. The device of claim 8, where the one or more processors, when assigning the score, are to:
assign the score based a speed to traverse the at least one travel path between candidate locations in the respective set of candidate locations.

10. The device of claim 9, where the speed is determined based on at least one speed limit corresponding to the at least one travel path.

11. The device of claim 8, where the one or more processors, when assigning the score, are to:
assign the score based on a number of U-turns required to traverse the at least one travel path between candidate locations in the respective set of candidate locations.

12. The device of claim 8, where the one or more processors are further to:
select a set of candidate locations, from the plurality of candidate locations, to be assigned the score based on the score assigned to a previous set of candidate locations.

13. The device of claim 8, where the one or more processors are further to:
select a set of candidate locations, form the plurality of candidate locations, using a searching algorithm that reduces a total road connectedness penalty of all candidate locations in the set of candidate locations.

14. The device of claim 13, where the searching algorithm includes at least one of:
an evolutionary algorithm,
a genetic algorithm,
simulated annealing,
particle swarm optimization,
greedy search,
exhaustive search, or
hill-climber search.

15. A non-transitory computer-readable medium for storing instructions, the instructions comprising:
a plurality of instructions which, when executed by one or more processors, cause the one or more processors to:
determine that a mobile device undergoes multiple cell transitions;
determine, for each cell transition of the multiple cell transitions, a plurality of candidate locations of the mobile device based on mobile communications data associated with at least two cells;
obtain geographic map data indicating at least one travel path;
assign a score to each of a plurality of sets of candidate locations based on a distance to travel on the at least one travel path between candidate locations in a respective set of candidate locations,
each of the plurality of sets of candidate locations including a candidate location for each cell transition of the multiple cell transitions; and
determine a route along the at least one travel path and associated with the mobile device based on the scores assigned to the plurality of sets of candidate locations.

16. The non-transitory computer-readable medium of claim 15, where the plurality of instructions further cause the one or more processors to:
assign the score based a speed to traverse the at least one travel path between candidate locations in the respective set of candidate locations.

17. The non-transitory computer-readable medium of claim 16, where the speed is determined based on at least one speed limit corresponding to the at least one travel path.

18. The non-transitory computer-readable medium of claim 15, where the plurality of instructions, that cause the one or more processors to assign the score, cause the one or more processors to:
- assign the score based on a number of duplicate passes down a same section of the at least one travel path required to traverse the at least one travel path between candidate locations in the respective set of candidate locations.

19. The non-transitory computer-readable medium of claim 15, where the plurality of instructions further cause the one or more processors to:
- select a set of candidate locations, from the plurality of candidate locations, to be assigned the score based on the score assigned to a previous set of candidate locations.

20. The non-transitory computer-readable medium of claim 15, where the plurality of instructions further cause the one or more processors to:
- select a set of candidate locations, form the plurality of candidate locations, using a searching algorithm that reduces a total road connectedness penalty of all candidate locations in the set of candidate locations.

\* \* \* \* \*